United States Patent
Hiramoto

(10) Patent No.: US 6,767,096 B2
(45) Date of Patent: Jul. 27, 2004

(54) EYEGLASS WITH CONNECTION STRUCTURE FOR RIMLESS EYEGLASS AND SCREWLESS HINGE

(75) Inventor: Kiyoshi Hiramoto, Hiroshima (JP)

(73) Assignees: 21 (Two-One) Co., Ltd., Hiroshima (JP); Masunaga Optical Mfg. Co., Ltd., Fukui (JP)

(*) Notice: Subject to any disclaimer, the term of this patent is extended or adjusted under 35 U.S.C. 154(b) by 0 days.

(21) Appl. No.: 10/421,913

(22) Filed: Apr. 24, 2003

(65) Prior Publication Data

US 2004/0012756 A1 Jan. 22, 2004

(30) Foreign Application Priority Data

Jul. 16, 2002 (JP) ........................................ 2002-207503
Jul. 16, 2002 (JP) ........................................ 2002-207504

(51) Int. Cl.⁷ .............................................. G02C 1/02
(52) U.S. Cl. ........................................ 351/110; 351/153
(58) Field of Search .............................. 351/153, 140, 351/124, 111, 41, 158, 110

(56) References Cited

U.S. PATENT DOCUMENTS

| | | | |
|---|---|---|---|
| 5,585,870 A | | 12/1996 | Masunaga |
| 5,835,183 A | | 11/1998 | Murai et al. |
| 5,847,801 A | * | 12/1998 | Masunaga ............... 351/153 |
| 6,050,685 A | | 4/2000 | Lin |
| 6,412,944 B1 | | 7/2002 | Huang et al. |
| 2002/0054272 A1 | | 5/2002 | Ebata |

FOREIGN PATENT DOCUMENTS

| | | |
|---|---|---|
| EP | 0838711 A1 | 4/1998 |
| FR | 2753283 A1 | 3/1998 |
| JP | 3007846 | 12/1994 |
| JP | 2001-75056 | 3/2001 |
| WO | WO97/43683 | 11/1997 |

* cited by examiner

*Primary Examiner*—Hung X. Dang
(74) *Attorney, Agent, or Firm*—Finnegan, Henderson, Farabow, Garrett & Dunner, LLP

(57) ABSTRACT

Eyeglasses with a connecting structure preventing deformation of parts or breakage of lenses even if excessive force is exerted on the eyeglasses, and a screwless hinge avoiding deflection of temple in vertical directions and stable in opening and closing. The connecting structure includes first member, fixed to lens, having mounting groove formed at outer periphery thereof and second member, connected to temple or bridge, having U-shaped bent portion introduced from one direction and resiliently engaging with the groove. The hinge includes cylindrical member provided on an end member, and J-shaped bent portion formed on the end of the temple, the bent member including first leg to be inserted into center hole of the cylindrical member and second leg contacting with outer periphery of the cylindrical member, when the first leg is inserted into the center hole, the first and second legs resiliently clamping the cylindrical member.

27 Claims, 11 Drawing Sheets

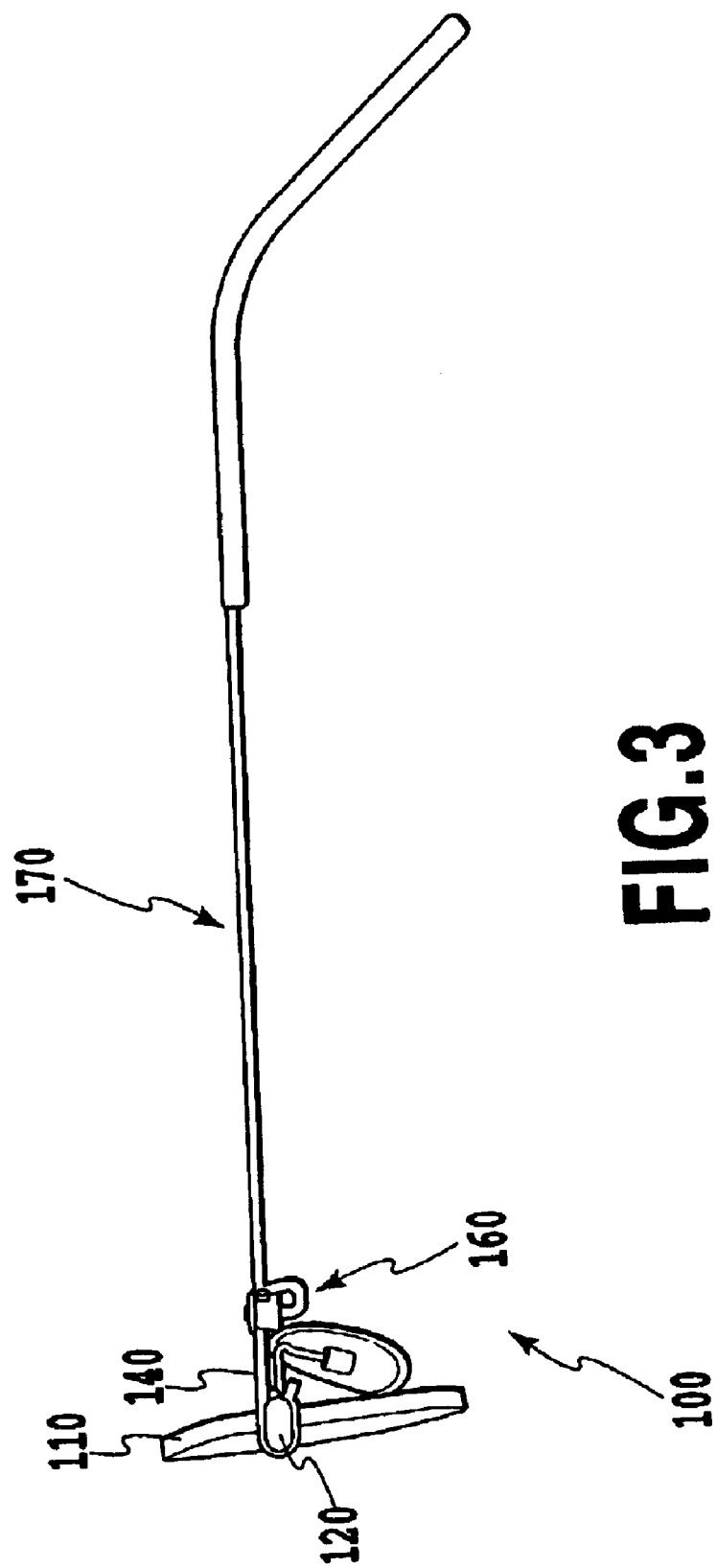

EYEGLASS WITH CONNECTION STRUCTURE FOR RIMLESS EYEGLASS AND SCREWLESS HINGE

This application claims priority from Japanese Patent Application Nos. 2002-207503 and 2002-207504 both filed Jul. 16, 2002, which are incorporated hereinto by reference.

BACKGROUND OF THE INVENTION

1. Field of the Invention

The present invention relates generally to a connection structure of eyeglasses. More particularly, the invention relates to eyeglasses having the connection structure for rimless eyeglasses, which has no rim for holding an outer periphery portion of lens, and having a screwless hinge.

2. Description of the Related Art

Conventionally, as rimless eyeglasses, those disclosed in U.S. Pat. No. 5,835,183 and Japanese Registered Utility Model No. 3007846 have been known, for example.

The rimless eyeglasses disclosed in U.S. Pat. No. 5,835,183 has end members connected to temples via hinge portions and a bridge. A first strip portion of U-shaped elastic clamp member formed in each of end portions of the end members and the bridge, is inserted into an aperture provided in a lens, and a second strip portion is engaged with a groove provided in an edge of the lens for clamping the lens between the aperture provided in the lens and the edge of the lens by means of the U-shaped elastic clamp member such that the lens and the end member and the bridge, respectively, are connected to each other.

On the other hand, eyeglasses disclosed in Japanese Registered Utility Model No. 3007846 is designed to connect and hold a pair of left and right lenses by means of a metal bridge having parallel line form edge contact portions which can line contact with inner edges of the lenses and inner piercing portions which can extend through bridge fixing apertures formed in the vicinity of inner edges of the lenses, and metal end members each having parallel line form edge contact portion which can line contact with outer edge of the lens and outer piercing portion which can extend through end member fixing aperture formed in the vicinity of the outer edge of the lens.

Moreover, a conventional screwless hinge for the eyeglasses has been known as disclosed in Japanese Patent Application Laid-Open No. 2001-075056.

In the screwless hinge disclosed in Japanese Patent Application Laid-Open No. 2001-075056, a connecting member of a linear material, which is fitted to a lens or a rim at one end, is formed with a U-shaped curved portion on the other end thereof. At an end of a temple, an engaging member formed with a circumferentially extending groove is provided. The engaging member is pivotably engaged with the connecting member between the U-shaped curved portion so that the U-shaped curved portion of the connecting member contacts with the circumferential groove of the engaging member at least two positions.

However, in such conventional rimless eyeglasses, in any cases, connection of eyeglass parts, such as a bridge, end members or the like, and the lens is established by inserting a first strip portion or inner and outer piercing portions formed in the end portion of the eyeglass part into the aperture formed in the lens and contacting a second strip portion or edge contact portion to the edge of the lens. Therefore, when a large external force acts to vary a distance (space) between the temples of the eyeglasses, for example, the eyeglass parts may be deformed and in the worst case, stress may be concentrated in the aperture portion of the lens to cause breakage of the lens.

On the other hand, such eyeglass parts are light in weight and small in shape and are typically produced of special metal in order to maintain necessary strength. Accordingly, in order to avoid direct contact of the metal associated with the lens and avoid exertion of unnecessary external force, special measures have to be taken, and a troublesome adjusting operation for adjusting these becomes necessary.

Furthermore, in such a conventional screwless hinge, the engaging member formed with the groove extending in the circumferential direction, is clamped with the U-shaped curved portion with contacting at least at two positions to permit pivotal motion of the temples. Therefore, it is structurally not possible to provide sufficient clamping force to cause deflection of the temples in vertical directions resulting in degradation of wearing comfort.

On the other hand, a recess is provided in the U-shaped curved portion having curvature matching with that of the engaging member so as to guide pivotal movement of the engaging member. However, the pivoting center of the engaging member cannot be uniform to cause instability in opening and closing the temple.

SUMMARY OF THE INVENTION

An object of the present invention is to solve the problems in the prior art and to provide eyeglasses which can prevent deformation of parts or breakage of lens when an excessive external force acts on the eyeglasses, and has connecting structure of the eyeglasses not requiring adjusting operation, or simply adjusted even when adjustment operation is required.

Another object of the present invention is to provide eyeglasses having screwless hinges which can avoid deflection of temples in vertical directions and can be opened and closed stably.

In accordance with an aspect of the invention, there is provided a connecting structure of eyeglasses comprising:

a first member fixed to an eyeglass lens; and a second member connected to a temple or a bridge;

wherein the first member has a mounting groove formed at least a part of an outer periphery portion thereof, and the second member has a substantially U-shaped bent portion introduced from one direction into the mounting groove and resiliently engaging with the mounting groove.

With the construction set forth above, when the excessive external force is exerted upon opening the temple or other occasion, the second member resiliently engaging the substantially U-shaped bent portion with the mounting groove formed on at least a part of the outer periphery portion of the first member is released from the first member. Accordingly, deformation of the first and second members and breakage of the lens can be prevented.

Here, the outer peripheral portion is an elliptic shape, and the mounting groove may be formed in a portion including at least one arc shaped portion of the outer periphery. Thus, sufficient contract area can be provided between the first member and the second member to ensure connection between the first member and the second member.

On the other hand, the outer peripheral portion may be a rectangular shape, and the mounting groove may be formed in a portion including at least a hole portion and a corner portion of the outer periphery portion. Thus, sufficient contract area can be provided between the first member and the second member to ensure connection between the first member and the second member. Furthermore, superiority in design can be obtained.

It should be noted that the first member is preferably formed of a resin. With such construction, freedom in design required for the eyeglasses can be increased and can be easily colored in the color different from the lens to make the eyeglasses more fashionable.

On the other hand, the first member may be fixed on the eyeglass lens by bonding or adhesion. Thus, working for forming apertures in the lens or adjustment operation becomes unnecessary to facilitate production of the eyeglasses.

Furthermore, it is also possible that the first member is fixed by inserting a leg portion into a lens aperture formed in the eyeglass lens.

Furthermore, the resin may be transparent. With such selection, a visual field is not restricted and becomes bright. On the other hand, foreign body sensation in the lens portion in appearance can be reduced to provide neat design for the eyeglasses.

It should be noted that the mounting groove of the first member may be arranged in a vertical direction as viewed from a front side. With the construction set forth above, neat appearance as viewed from a front side can be provided to make the eyeglasses more fashionable.

Furthermore, the mounting groove of the first member may be formed over an entire circumference of the elliptic outer periphery portion, and one end portion of the substantially U-shaped bent portion may be formed to penetrate into other arc shaped portion. Thus, mounting of the second member relative to the first member can be ensured to assure connection between the first member and the second member.

The second member may be an end member connected to a temple via a hinge or a bridge formed from one piece wire member.

In accordance with another aspect of the invention, there is provided a screwless hinge comprising:

an end member mounted on a lens;

a temple member;

a substantially cylindrical member provided on one of the end member and the temple member; and a J-shaped bent portion formed on the other of the end member and the temple member, wherein the J-shaped bent member includes a first leg portion to be inserted into a center hole of the cylindrical member and a second leg portion contacting with an outer periphery portion of the cylindrical member, when the first leg portion is inserted into the center hole, the first leg portion and the second leg portion resiliently clamping the cylindrical member.

With the construction set forth above, a rotation center of the temple member is formed by the first leg portion inserted into the center hole of the cylindrical member. Furthermore, since the cylindrical member is resiliently clamped by the first leg portion and the second leg portion, the temple does not deflect in vertical directions and opening and closing of the screwless hinge becomes stable.

Here, the cylindrical member may be formed into a substantially drum shape including a groove constituted of a flange portion formed in an upper portion thereof, a sectionally arc shaped recess having a predetermined curvature radius located immediately below the flange, and a linear slop surface smoothly continuous with the recess, and the second leg portion of the J-shaped bent portion may be bent to be complement with the groove. With such a construction, when the first leg portion is inserted into the center hole of the cylindrical member, the second leg portion bent along the recessed portion is inherently placed at the predetermined position to establish a connection without offset. The temple does not deflect in vertical directions, and the screwless hinge to be stably opened and closed can be obtained.

On the other hand, the cylindrical member may be formed integrally in such a manner that the leg member of one of the end member and the temple member bond to the arc shaped recess. With the construction set forth above, the position of the end member and the temple member can be arranged in an in-line alignment. A neat screwless hinge in design can be obtained.

Furthermore, preferably, the second leg portion may be bent from the end portion of the other of the end member and the temple member in an acute angle relative to a straight portion, an outer contour of the bent portion has a curvature radius equal to that of the arc shaped recess. With the construction set forth above, it becomes possible to establish a connection without offset. The temple does not deflect in vertical directions, and the screwless hinge to be stably opened and closed can be obtained.

In accordance with another aspect of the invention, there is provided eyeglasses comprising:

a pair of lenses;

end member side first members, each being fixed to the lens and having a mounting groove formed at least a part of an outer periphery portion thereof;

bridge side first members, each being fixed to the lens and having a mounting groove formed at least a part of an outer periphery portion thereof;

end members, each having a substantially U-shaped bent portion being introduced into the end member side first member from one direction and resiliently engaging with the mounting groove;

a bridge member having substantially U-shaped bent portions, each being introduced into the bridge side first member from one side and resiliently engaging with the mounting groove;

a screwless hinge comprising a substantially cylindrical member provided on one of the end member and the temple member, and a J-shaped bent portion formed on the other of the end member and the temple member, wherein the J-shaped bent member includes a first leg portion to be inserted into a center hole of the cylindrical member and a second leg portion contacting with an outer periphery portion of the cylindrical member, when the first leg portion is inserted into the center hole, the first leg portion and the second leg portion resiliently clamping the cylindrical member.

The above and other objects, effects, features and advantages of the present invention will become more apparent from the following description of embodiments thereof taken in conjunction with the accompanying drawings.

BRIEF DESCRIPTION OF THE DRAWINGS

FIG. 3 is a side elevation showing one embodiment of rimless eyeglasses having screwless hinges according to the present invention;

DETAILED DESCRIPTION OF PREFERRED EMBODIMENTS

Embodiments of the present invention will be discussed hereinafter with reference to the accompanying drawings. It should be noted that, in the description of the disclosure, expression showing directions, such as "front and rear", "left and right" and "up and down" expresses directions as worn by a person in a normal condition.

Figure 1:
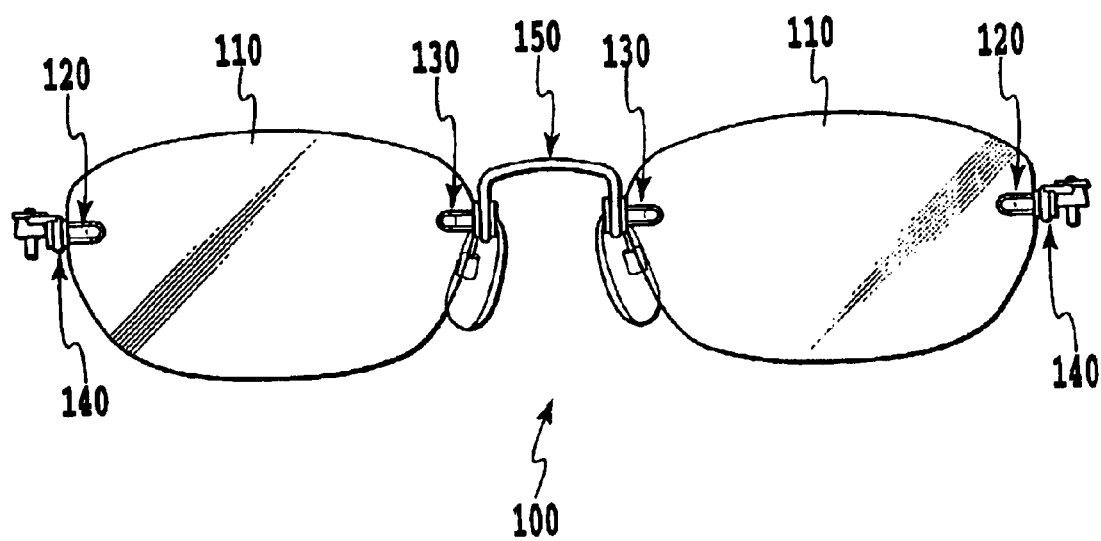
FIG. 1 is a front elevation showing one embodiment of rimless eyeglasses having screwless hinges according to the present invention.
Figure 2:
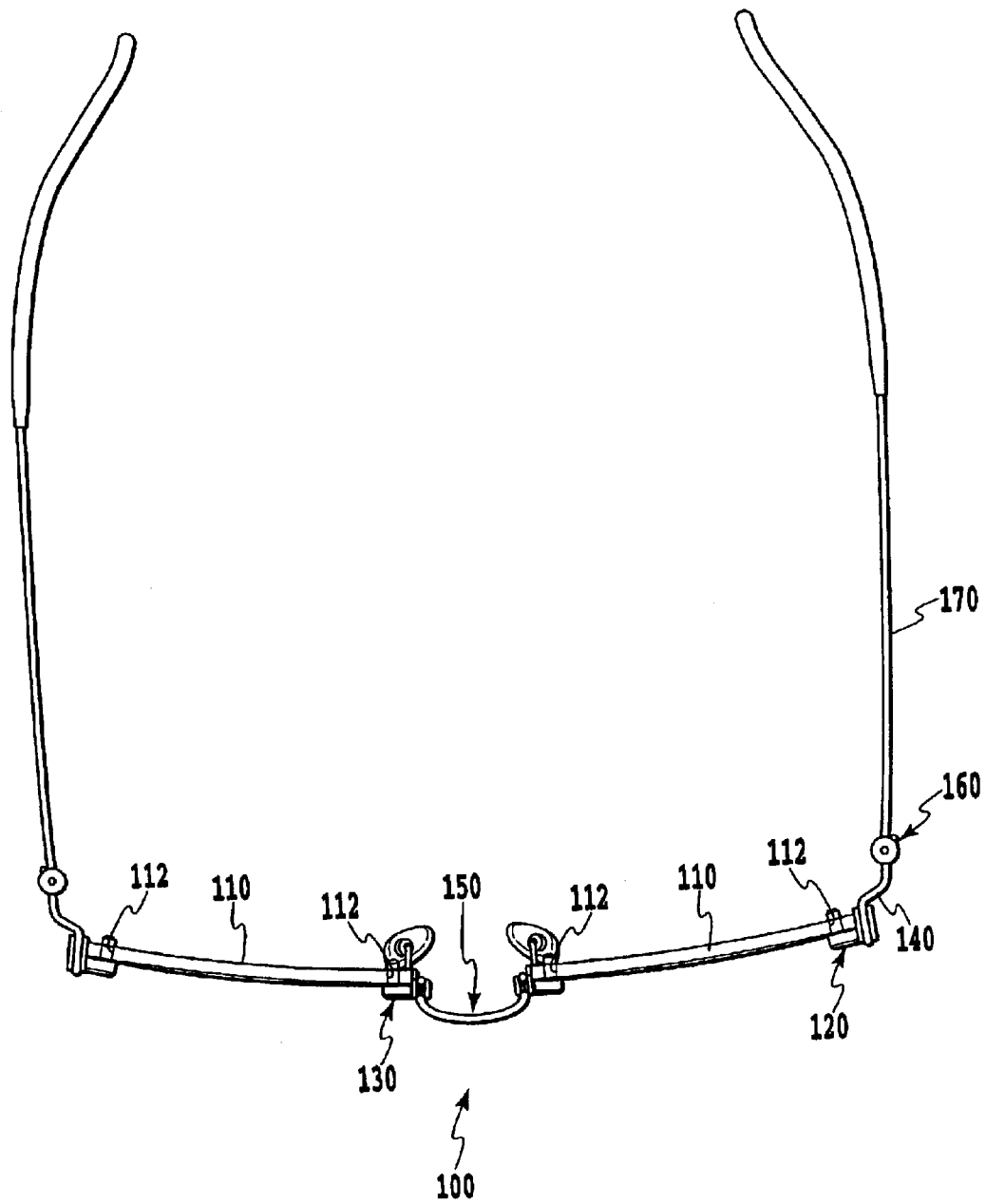
FIG. 2 is a plan view showing one embodiment of rimless eyeglasses having screwless hinges according to the present invention.

In FIGS. 1 to 3, one embodiment of rimless eyeglasses 100 according to the present invention includes left and right lenses 110, end member side resin parts 120 and bridge side resin parts 130 as a first member fixed to the lens 110, end members as a second member connected to temples 170 via hinges 160, and a bridge 150 similarly as the second member.

Figure 4A:
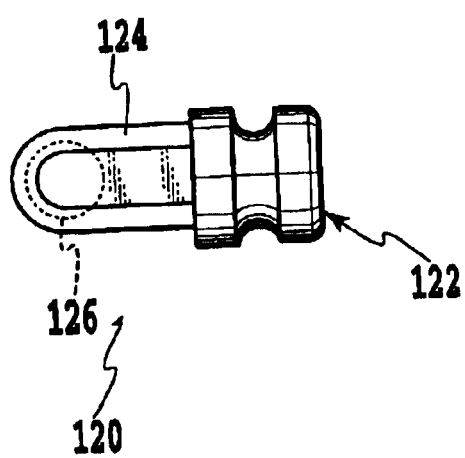
FIGS. 4A, 4B and 4C are a front elevation, a plan view, and a side elevation respectively showing one embodiment of an end member side resin part of rimless eyeglasses according to the present invention.
Figure 4C:
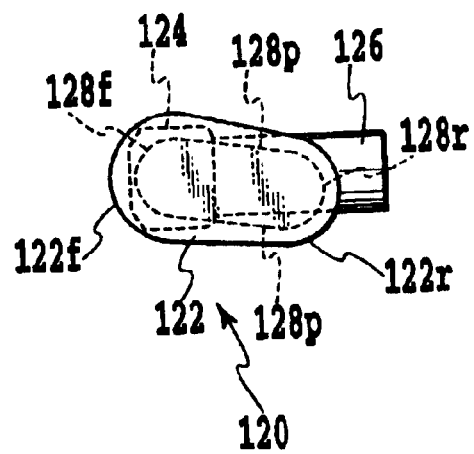
Figure 4B:
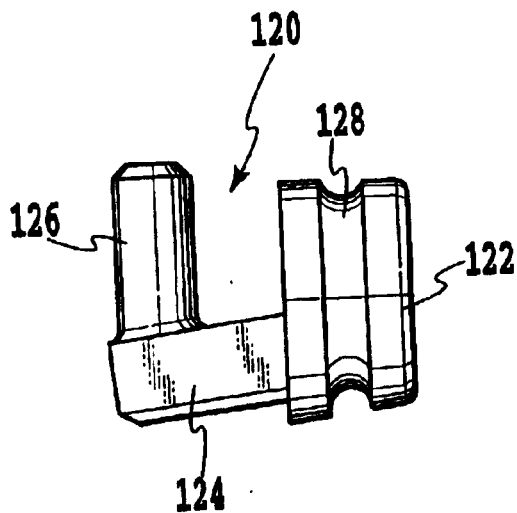

As shown in FIGS. 4A to 4C, each of end member side resin parts 120 as the first member includes a substantially elliptic shape base portion 122 extending in a plane substantially parallel to an outside surface of the lens 110 and being located with partly contacting with a side surface of the lens 110, an arm portion 124 extending from the base portion 122 and located on a front surface of the lens 110 and a leg portion 126 projecting rearwardly from the arm portion 124 substantially in parallel to the base portion 122. On the outer periphery portion of the base portion 122, a mounting groove 128 is formed. As can be best seen from FIG. 4C, the elliptic base portion formed with the mounting groove 128 has two arc portions 122f and 122r. In the shown embodiment, the two arc portions are arranged in back and forth directions substantially in parallel to an optical axis of the lens 110.

The mounting groove 128 is required to be formed at a portion including at least the front side arc portion 122f of the outer periphery portion. However, assuring mounting of the second member discussed later, the mounting groove 128 is formed over the entire circumference of the elliptic outer periphery portion including two arc portions 112f and 112r on the front and rear sides as shown in FIGS. 4C to 4C. As a result, the bottom of the mounting groove 128 is formed to have a front side arc portion 128f, a rear side arc portion 128r and a parallel portion 128p extending therebetween.

Figure 5A:
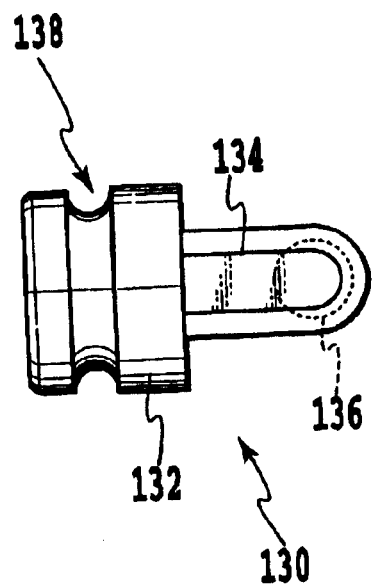
FIGS. 5A, 5B and 5C are a front elevation, a plan view and a side elevation respectively showing one embodiment of a bridge side resin part of rimless eyeglasses according to the present invention.
Figure 5C:
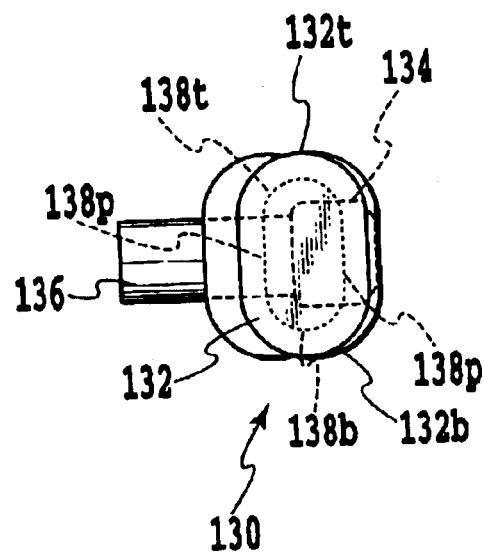
Figure 5B:
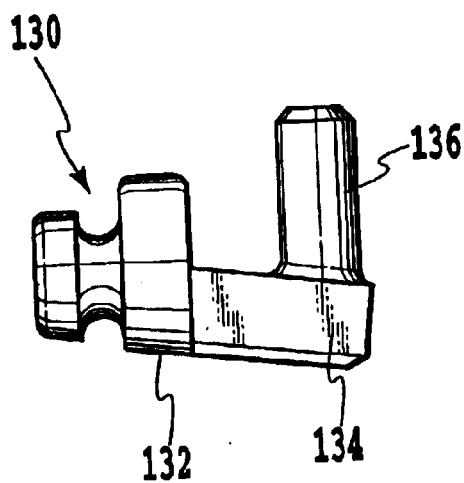

Similarly, as shown in detail in FIGS. 5A to 5C, each of bridge side resin parts 130 as the first member includes a substantially elliptic base portion 132 extending in a plane substantially parallel to an inner side surface of the lens 110 and being located with partly contacting with the side surface of the lens, an arm portion 134 extending from the base portion 132 and located the front surface of the lens 110 and a leg portion 136 projecting rearwardly from the arm portion 134 and extending in parallel to the base portion 132. On the outer periphery portion of the base portion 132, a mounting groove 138 is formed. As clearly shown in FIG. 5C, the elliptic base portion 132 formed with the mounting groove 138 includes two arc portions 132t and 132b. In the shown embodiment, the two arc portions are arranged vertically substantially perpendicular to the optical axis of the lens 110.

The mounting groove 138 is required to be formed at a portion including at least the upper side arc portion 132t of the outer periphery portion. However, assuring mounting of the bridge 150 as the second member discussed later, the mounting groove 138 is formed over the entire circumference of the elliptic outer periphery portion including the two arc portions 132t and 132b on the upper and lower sides as shown in FIGS. 5A to 5C. As a result, the bottom of the mounting groove 138 is formed to have the upper side arc portion 138t, the lower side arc portion 138b and a parallel portion 138p extending therebetween.

It should be noted that, in the shown embodiment, as can be clear from FIGS. 1 and 2, lens apertures 112 are formed in the vicinity of inner and outer edge portions.

In the shown embodiment, each of end members 140 is formed from a single metal wire (for example, a resilient member of titanium alloy, nickel-chrome alloy, nickel-titanium alloy and the like). At one end portion of the end member 140, a screwless hinge 160 which will be discussed later, is provided. Then, a temple 170 is connected via the hinge 160. It should be noted that the temple 170 may be formed integrally with the end member 140 without providing the hinge 160.

Figure 6A:
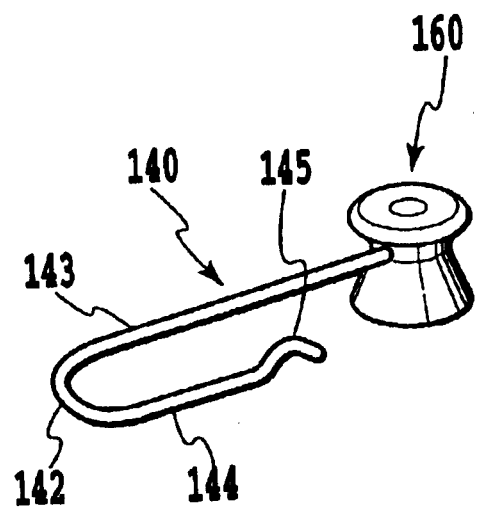
FIG. 6A is a perspective view showing one example of an end member of one embodiment of rimless eyeglasses according to the present invention.
Figure 6B:
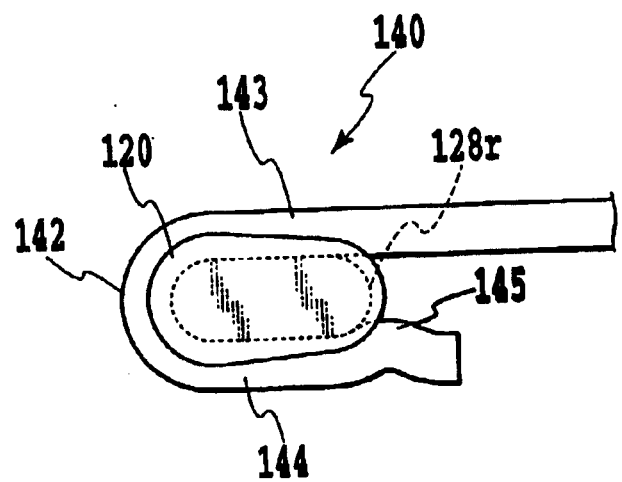
FIG. 6B is a side elevation showing a connecting condition between the end member side resin part and the end member.

Here, in the end member 140, a substantially U-shaped bent portion 142 is formed on the end portion remote from the hinge 160. The bent portion 142 is introduced into the end member side resin parts 120 from one direction and resiliently engaged with the mounting groove 128. The substantially U-shaped bent portion 142 is continuous with a first leg portion 143, which is connected to the hinge 160, and a second leg portion 144. The first leg portion 143 and the second leg portion 144 are resiliently engage with the parallel portion 128p of the mounting groove 128 clamping the parallel portion. Furthermore, as shown in FIGS. 6A and 6B, at the tip end of the second leg portion 144, a curved portion 145 slightly bowing toward the first leg portion 143 for engaging along the rear side arc portion 128r of the mounting groove 128.

Figure 7:
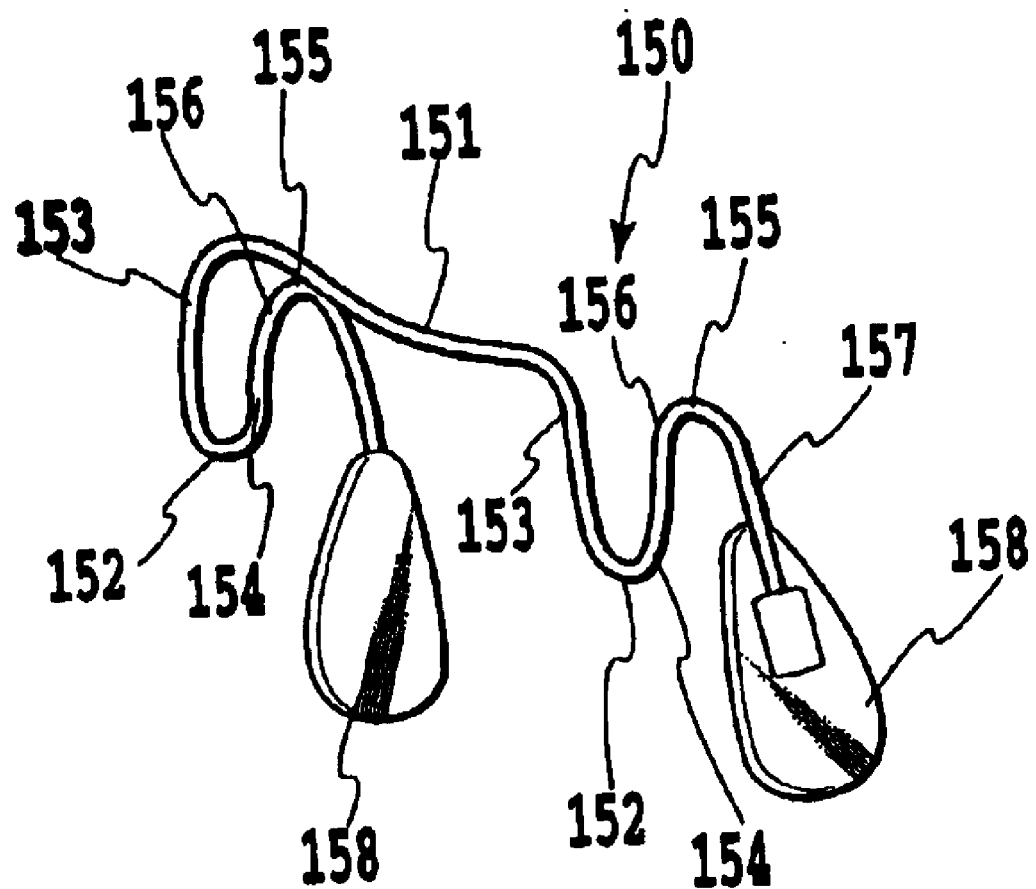
FIG. 7 is a perspective view showing one example of a bridge of one embodiment of rimless eyeglasses according to the present invention.

Next, similarly, the bridge 150 is formed from a metal wire (for example, a resilient member, such as titanium alloy, nickel-chrome alloy, nickel-titanium alloy and the like) with first U-shaped bent portions 152 and second U-shaped bent portions 155 continuous therewith. In the shown embodiment, first leg portions 153 of the first U-shaped bent portions 152 are connected to each other by a connecting portion 151. It should be noted that, as shown in detail in FIG. 7, second leg portions 154 of the first U-shaped bent portions 152 are linearly continuous with first leg portions 156 of second U-shaped bent portions 155. Both of the first leg portions 153 and the second leg portions 154 of the first U-shaped bent portions 152 engage with the mounting grooves 138 of the bridge side resin parts 130. On tip ends of second leg portions 157 of the second U-shaped bent portions 155, nose pads 158 are mounted.

Here, the first U-shaped bent portions 152 project downward of the eyeglasses, and the first leg portion 153 and the second leg portion 154 are substantially parallel to each other. On the other hand, the second U-shaped bent portions 155 having the first leg portions 156 linearly continuous with the second leg portions 154 of the first U-shaped bent portions 152 are upwardly convex, and the first leg portions 156 and the second leg portions 157 are substantially parallel to each other. As can be clear from FIG. 1, the first leg portions 153 of the first U-shaped bent portions 152 (and the first leg portions 156 of the second U-shaped bent portions 155) and the second leg portions 157 of the second U-shaped bent portions 155 are formed to overlap with each other as viewed from a front side of the eyeglasses.

It should be noted that the reference numeral 158 denotes the nose pad. In the shown embodiment, the nose pads 158 are mounted on tip end portions of the second leg portions 157 of the second U-shaped bent portions 155 forming the bridge 150. However, the nose pads 158 may be mounted on other pad arms.

Figure 8A:
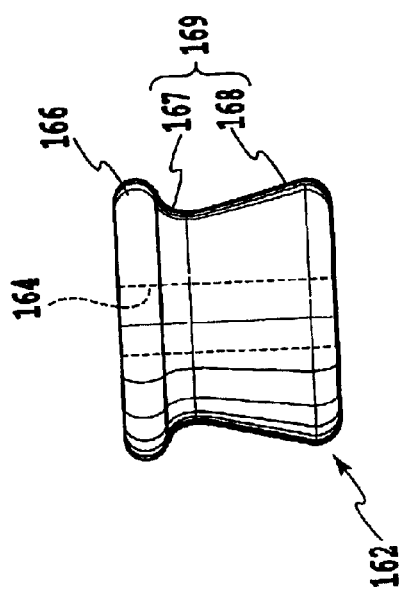
FIGS. 8A and 8B are a side elevation and a plan view respectively showing a socket member of screwless hinge in one embodiment of the present invention.
Figure 8B:
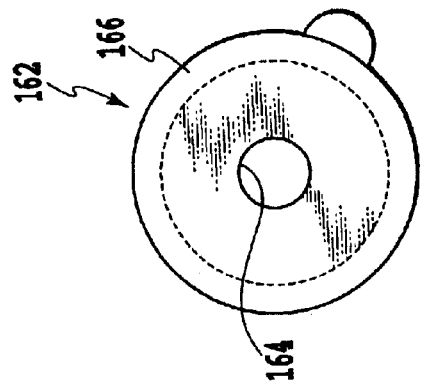
Figure 8C:
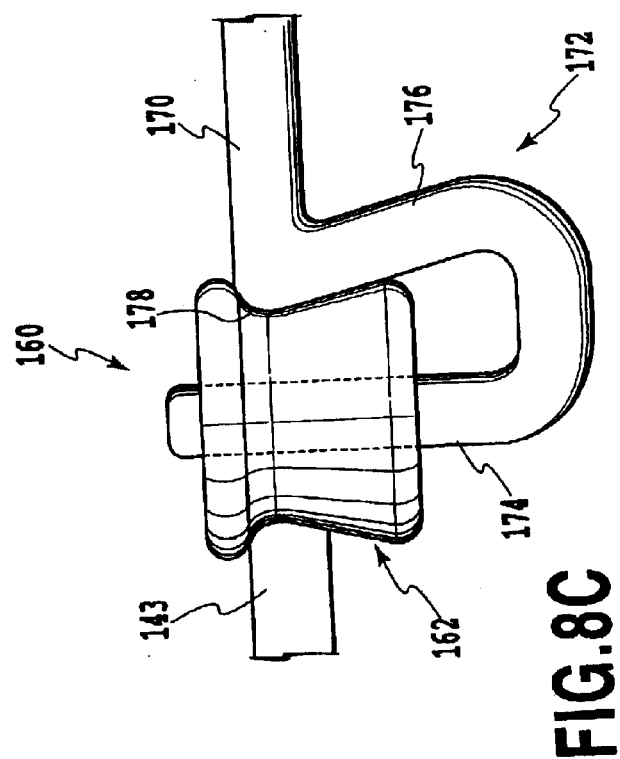
FIG. 8C is a side elevation showing a screwless hinge structure.
Figure 9A:
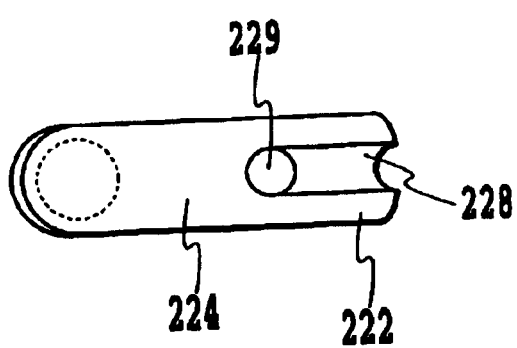
FIGS. 9A, 9B and 9C are a front elevation, a plan view and a side elevation respectively showing an end member side resin part of another embodiment of rimless eyeglasses according to the present invention.
Figure 9C:
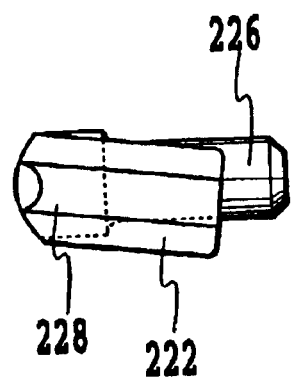
Figure 9B:
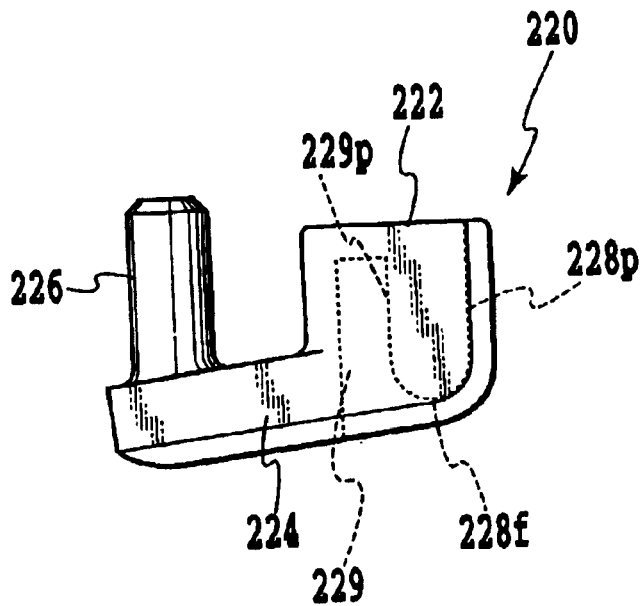
Figure 10A:
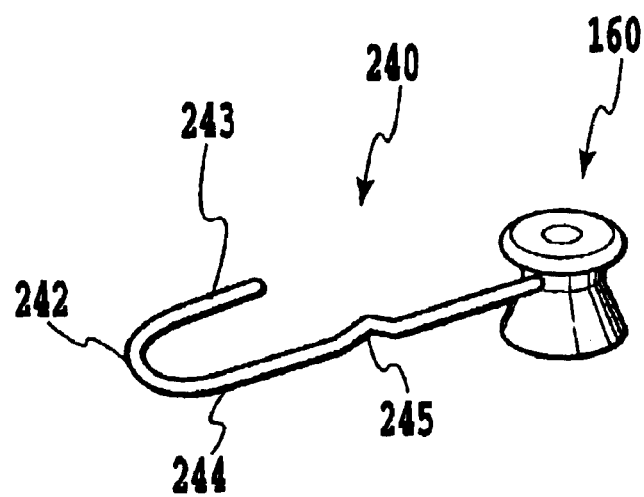
FIG. 10A is a perspective view showing one example of the end member of another embodiment of the rimless eyeglass according to the present invention.
Figure 10B:
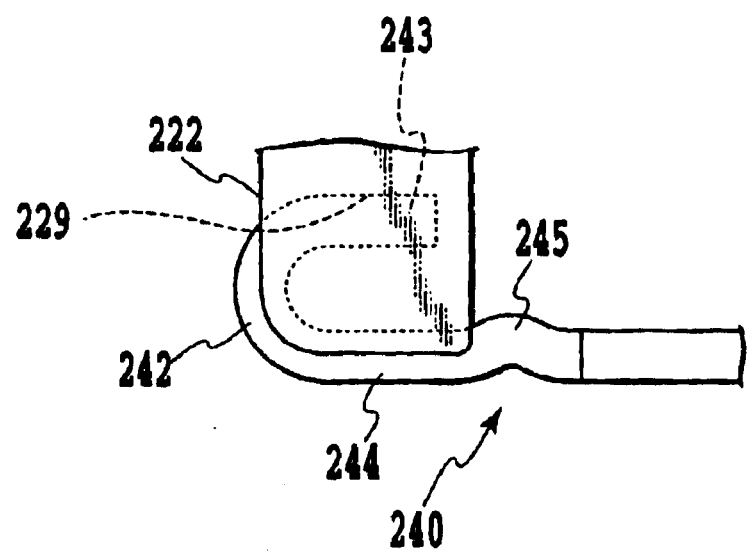
FIG. 10B is a side elevation showing a connecting condition of the end member side resin part and the end member.

Furthermore, discussion will be given for the screwless hinge 160 and the temple 170 with reference to FIGS. 8A to 8C. In the shown embodiment, the hinge 160 is constructed by a combination of a substantially drum shaped socket member 162 and a J-shaped bent portion 172 formed at an end portion of the temple 170. In more detail, in the socket member 162, a through hole 164 is formed at the center thereof, and a flange portion 166 is formed at the upper portion thereof. Immediately below the flange portion 166, a sectionally arc shaped recess 167 having a given radius and a sloped surface 168 smoothly continuous and linearly extending are formed to define a groove 169. Then, in the shown embodiment, the socket member 162 is formed integrally with the end member 140 in a form that the first leg portion 143 of the end member 140 is bonded to the arc shaped recess 167 (see FIGS. 6A and 8C).

The J-shaped bent portion 172 formed at the end portion of the temple 170 formed from the metal wire (for example, a resilient member, such as titanium alloy, nickel-chrome alloy, nickel-titanium alloy and so forth) has a first leg portion 174 to be inserted through the through hole 164 of the socket member 163 and a second leg portion 176. When the first leg portion 174 is inserted to the through hole 164, the socket member 162 is resiliently clamped with the first leg portion 174 and the second leg portion 176. Furthermore, the second leg portion 176 is bent for forming an acute angle with respect to the straight portion of the end portion of the temple 170. Outer contour 178 of the bent portion has a curvature radius equal to the curvature radius of the arc shaped recess 167.

In one embodiment of the present invention, the rimless eyeglasses 100 can be assembled and completed in the following manner. At first, by inserting the leg portions 126 of the end member side resin parts 120 and the leg portions 136 of the bridge side resin parts 130 into the lens apertures 112 in the vicinity of the inner and outer edge of the lens 110, the end member side resin parts 120 and the bridge side resin parts 130 are respectively secured to the lens 110. Then, to the bridge side resin parts 130, the bridge 150 is mounted to connect the left and right lenses 110. Mounting of the bridge 150 is performed by orienting the first U-shaped bent portions 152 downwardly, and then by engaging the first leg portions 153 and the second leg portions 154 (and the first leg portion 156 of the second U-shaped bent portion 155) with the mounting grooves 138 of the bridge side resin parts 130 from lower side. After completion of introduction, the first U-shaped bent portions 152 engage with the lower side arc portions 138b of the mounting grooves 138, and the first leg portions 153 and the second leg portions 154 resiliently clamp the parallel portions 138P of the mounting grooves 138 to certainly connect the left and right lenses 110.

In such a condition, next the end member 140 is mounted to each of the end member side end parts 120. Similarly to the case of the bridge 150, mounting of the end member 140 is performed by frontwardly orienting the U-shaped bent portion 142 of the end member and by engaging the first leg portion 143 and the second leg portion 144 with the mounting groove 128 of the end member side resin part 120 from front side. After completion of introduction, the first U-shaped bent portion 142 engages with the front side arc portion 128f of the mounting groove 128, and the first leg portion 143 and the second leg portion 144 resiliently clamp the parallel portion 128P of the mounting groove 128. Furthermore, the curved portion 145 of the second leg portion 144 enters into the rear side arc portion 128r of the mounting groove 128. As a result, the end members 140 are certainly connected to both the end member side resin parts 120 with avoiding play or the like.

Finally, to the drum shaped socket member 162 formed integrally with the end member 140, the temple 170 is connected. In greater detail, the first leg portion 174 of the J-shaped bent portion 172 formed at the end portion of the temple 170 is inserted into the through hole 164 of the socket member 162, and in conjunction therewith, the second leg portion 176 is engaged with the groove 169 to resiliently clamp the socket member 162 with the first leg portion 174 and the second leg portion 176. Thus, the rimless eyeglasses 100 can be completed by connecting respective parts without using any screws.

In the rimless eyeglasses 100 constructed with employing the connecting structure set forth above, when an excessive external force is exerted on the eyeglasses via the temple 170 or the like, the end member side resin parts 120 or the bridge side resin parts 130 as the first member and the end member 140 or the bridge 150 as the second member are disengaged, with either one of substantially U-shaped bent portions 142 and 152 resiliently engaging with the mounting grooves 128 of the end member side resin parts 120 and the mounting grooves 138 of the bridge side resin parts 130 or both being resiliently deformed. As a result, deformation of the parts including the end members 140, the bridge 150, the temples 170 and the like or breakage of the lenses 110 can be successfully prevented.

Next, another embodiment of connecting structure of the present invention will be discussed with reference to FIGS. 9A to 9C, 10A and 10B. It should be noted that, in the following disclosure, reference numerals in another embodiment will use 2 in hundred's position for distinguishing the former embodiment, in which 1 is used in hundred's position. Also, unless specified otherwise, the same numbers in the last two digits identify the same or the same functional parts as in the first embodiment. Accordingly, an explanation made given for the former embodiment is taken as an explanation for the another embodiment by replacing the hundred's position of the reference numerals with 2, except for different points therebetween.

A different point between the another embodiment and the former embodiment is that modification of the shapes of the end member side resin parts and the end member is made. Namely, in the another embodiment, in a base portion 222 of an end member side resin part 220, a bottomed hole 229 is formed. Also, on a part of the outer periphery portion of the base portion, amounting groove 228 is formed continuous with the bottomed hole 229. The base portion 222 formed with the mounting groove 228 is a rear end closed rectangular shape as can be clear from FIGS. 9A to 9C. The mounting groove 228 is formed in a portion including the bottomed hole 229 and at least a corner portion between the front side and the lateral side of the outer periphery portion. As a result, the bottom of the mounting groove 228 has a shape having a front side arc portion 228f, a side wall 229p of the bottomed hole 229 and a parallel portion 228p extending in parallel thereto, as viewed from the above.

Here, the end member 240 is formed with a substantially U-shaped bent portion 242 at an end portion remote from a hinge 160 to be introduced into the bottomed hole 229 of the end member side resin part 220 and to resiliently engage with the mounting groove 228. In detail, the substantially U-shaped bent portion 242 has a first leg portion 243 to be inserted into the bottomed hole 229 and a second leg portion 244 continuous with the hinge 160. The first leg portion 243 and the second leg portion 244 resiliently engage with the side wall 229P of the bottomed hole 229 and the parallel portion 228p of the mounting groove 228. Furthermore, at the intermediate position of the second leg portion 244, a curved portion 245 slightly projecting toward the first leg portion 243 is provided to enter into the rear end side of the base portion 222 after passing through the mounting groove 228.

Even in this another embodiment, after securing the end member side resin part 220 to the lens 110, by orienting the U-shaped bent portion 242 of the end member 240, and then inserting the first leg portion 243 into the bottomed hole 229 while introducing the second leg portion 244 into the mounting groove 228 of the end member side resin parts 220, connection is established.

Next, further embodiment of the present invention will be discussed. The foregoing discussion has been given for the embodiments, in which the end member side resin parts 120(220) and the bridge side resin parts 130 as the first member have the leg portions 126(226) and the leg portion 136, respectively, and the lens apertures 122 are formed in the lenses 110 corresponding to the leg portions. As further embodiment, either or both of the leg portion 126(226) and the leg portion 136 of the end member side resin part 120(220) and the bridge side resin part 130 can be eliminated, and corresponding to this elimination, the lens apertures 112 to be formed in the lens 110 can also be eliminated.

As set forth above, the end member side resin part 120(220) and the bridge side resin part 130 eliminated the leg portion are secured directly to the surface of the lens 110 by applying adhesive or the like to the arm portions 124 (224) and 134. With such construction, formation of the lens apertures in the lenses becomes unnecessary, and adjustment operation of positioning also becomes unnecessary to significantly reduce working steps.

Furthermore, the end member side resin part 120(220) and the bridge side resin part 130 may be colored with a special color. By this, the eyeglasses become more fashionable. On the other hand, the resin parts may be transparent. Particularly, in case of the end member side resin part 120(220) and the bridge side resin part, in which the leg portion has been eliminated, visual field may not be restricted and thus becoming bright. Furthermore, even in appearance, foreign body sensation in the lenses portion can be reduced to provide nest design for the eyeglasses.

It should be noted that the mounting grooves 128 and 138 of the end member side resin part 120 and the bridge side resin part 130 are preferably arranged in a vertical direction or a horizontal direction as viewed from the front side for making the appearance more fashionable as viewed from the front side.

Introducing, in other words inserting direction, of the end member 140 and the bridge 150 into the mounting groove 128(228) and the mounting groove 138 of the end member side resin part 120(220) and the bridge side resin part 130, respectively, is from the front side in the case of the end member 140 and from lower side in the case of the bridge 150 in the former embodiments. However, introducing direction or inserting direction can be any direction as long as it is predetermined one direction.

Figure 11:
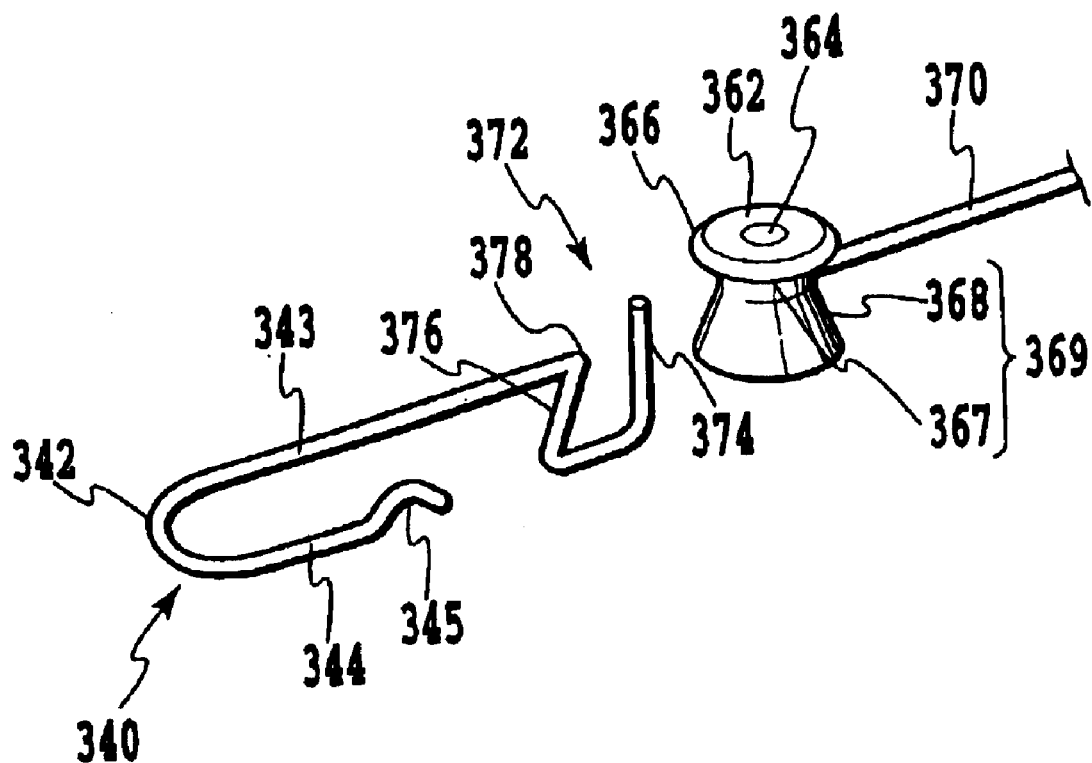
FIG. 11 is an exploded perspective view showing a structure of another embodiment of the screwless hinge according to the present invention.

Furthermore, a still further embodiment of the screwless hinge according to the present invention will be discussed with reference to FIG. 11. In the following discussion, the reference numerals in the further embodiment will use 3 in hundred's position for distinguishing the former embodiments, in which 1 or 2 is used in hundred's position. Also, unless specified otherwise, the same numbers in the last two digits identify the same or the same functional parts as in the former embodiments. Accordingly, an explanation made given for the former embodiments is taken as an explanation for the another embodiment by replacing the hundred's position of the reference numerals with 3, except for different points therebetween.

The point where the still further embodiment is differentiated from the foregoing embodiments is that positions to mount the drum shaped socket member and to form the J-shaped bent portion are modified. Namely, in the still further embodiment, a drum shaped socket member 362 is connected to a temple 370 in contact, and a J-shaped bent portion 372 is formed at the end of a first leg portion 343 of an end member 340. The socket member 362 is formed with a through hole 364 at the center, and a flange portion 366 at the upper portion. Also, an annular groove 369 consisted of an arc shaped recess 367 having a predetermined curvature radius and a linear slop 368 smoothly continuous with the arc shaped recess 367, is formed. Similarly to the former embodiments, the socket member 362 is formed integrally with the temple 370 in such a manner that the end portion of the temple 370 mates with the arc shaped recess 367. On the other hand, the first leg portion 343 of the end member 340 and a second leg portion 376 of the J-shaped bent portion 372 are bent at an acute angle with respect to the straight portion of the end portion of the first leg portion 343. An outer contour 378 at the bent portion is formed to have a curvature radius equal to that of the arc shaped recess 367 in the socket member 362 similarly to the former embodiments.

As set forth above, while the preferred embodiments of the present invention have been discussed, the present invention should not be limited to the foregoing embodiment. Namely, the features in one or other embodiments may be exchanged with each other. For instance, the inserting directions of the end member 140 and the bridge 150 may be reversed. Moreover, the socket member of the hinge and the substantially J-shaped bent portion may be reversed in the vertical direction.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A connecting structure of eyeglasses comprising:
   a first member fixed to an eyeglass lens; and
   a second member connected to a temple or a bridge;
   wherein said first member has a mounting groove formed in at least a part of an outer periphery portion thereof, and
   said second member has a substantially U-shaped bent portion introduced from one direction into the mounting groove and resiliently engaging with said mounting groove.

2. A connecting structure of eyeglasses as claimed in claim 1, wherein said outer peripheral portion is an elliptic shape, and said mounting groove is formed in a portion including at least one arc shaped portion of said outer periphery.

3. A connecting structure of eyeglasses as claimed in claim 2, wherein said mounting groove of said first member is formed over an entire circumference of an elliptic outer periphery portion, and one end portion of said substantially U-shaped bent portion is formed to penetrate into said arc shaped portion.

4. A connecting structure of eyeglasses as claimed in claim 1, wherein said outer peripheral portion is a rectangular shape, and said mounting groove is formed in a portion including at least a hole portion and a corner portion of said outer periphery portion.

5. A connecting structure of eyeglasses as claimed in claim 1, wherein said first member is formed of a resin.

6. A connecting structure of eyeglasses as claimed in claim 5, wherein said resin is transparent.

7. A connecting structure of eyeglasses as claimed in claim 1, wherein said first member is fixed on the eyeglass lens by bonding.

8. A connecting structure of eyeglasses as claimed in claim 1, wherein said first member is fixed by inserting a leg portion thereof into a lens aperture formed in said eyeglass lens.

9. A connecting structure of eyeglasses as claimed in claim 1, wherein said mounting groove of said first member is arranged in a vertical direction as viewed from a front side.

10. A connecting structure of eyeglasses as claimed in claim 1, wherein said second member is an end member connected to a temple via a hinge.

11. A connecting structure of eyeglasses as claimed in claim 1, wherein said second member is a bridge formed from one piece wire member.

12. A screwless hinge comprising:
    an end member mounted on a lens;
    a temple member;
    a substantially cylindrical member provided on one of said end member and said temple member; and
    a J-shaped bent portion formed on the other of said end member and said temple member,
    wherein said J-shaped bent member includes a first leg portion to be inserted into a center hole of said cylindrical member and a second leg portion contacting with an outer periphery portion of said cylindrical member, when said first leg portion is inserted into the center hole, said first leg portion and said second leg portion resiliently clamping said cylindrical member.

13. A screwless hinge as claimed in claim 12, wherein said cylindrical member is formed into a substantially drum shape including a groove constituted of a flange portion formed in an upper portion thereof, a sectionally arc shaped recess having a predetermined curvature radius located immediately below said flange, and a linear slop surface smoothly continuous with said recess, and said second leg portion of said J-shaped bent portion is bent to be complement with said groove.

14. A screwless hinge as claimed in claim 13, wherein said cylindrical member is formed integrally in such a manner that a leg portion of one of said end member and said temple member contacts with said arc shaped recess.

15. A screwless hinge as claimed in claim 14, wherein said second leg portion is bent from the end portion of the other of said end member and said temple member in an acute angle relative to a straight portion, an outer contour of the bent portion has a curvature radius equal to that of said arc shaped recess.

16. Eyeglasses comprising:
    a pair of lenses;
    end member side first members, each being fixed to said lens and having a mounting groove formed at least a part of an outer periphery portion thereof;
    bridge side first members, each being fixed to said lens and having a mounting groove formed at least a part of an outer periphery portion thereof;
    end members, each having a substantially U-shaped bent portion being introduced into said end member side first member from one direction and resiliently engaging with said mounting groove;
    a bridge member having substantially U-shaped bent portions, each being introduced into said bridge side first member from one side and resiliently engaging with said mounting groove;
    a screwless hinge comprising a substantially cylindrical member provided on one of said end member and said temple member, and a J-shaped bent portion formed on the other of said end member and said temple member, wherein said J-shaped bent member includes a first leg portion to be inserted into a center hole of said cylindrical member and a second leg portion contacting with an outer periphery portion of said cylindrical member, when said first leg portion is inserted into the center hole, said first leg portion and said second leg portion resiliently clamping said cylindrical member.

17. Eyeglasses as claimed in claim 16, wherein said outer peripheral portion is an elliptic shape, and said mounting groove is formed in a portion including at least one arc shaped portion of said outer periphery.

18. Eyeglasses as claimed in claim 17, wherein said mounting groove of said first member is formed over an entire circumference of the elliptic outer periphery portion, and one end portion of said substantially U-shaped bent portion is formed to penetrate into the other arc shaped portion.

19. Eyeglasses as claimed in claim 16, wherein said outer peripheral portion is a rectangular shape, and said mounting groove is formed in a portion including at least a hole portion and a corner portion of said outer periphery portion.

20. Eyeglasses as claimed in claim 16, wherein said first members are formed of a resin.

21. Eyeglasses as claimed in claim 20, wherein said resin is transparent.

22. Eyeglasses as claimed in claim 16, wherein said first members are fixed on the eyeglass lenses by bonding.

23. Eyeglasses as claimed in claim 16, wherein each of said first members is fixed by inserting a leg portion thereof into a lens aperture formed in said eyeglass lens.

24. Eyeglasses as claimed in claim 16, wherein said mounting groove of said first member is arranged in a vertical direction as viewed from a front side.

25. Eyeglasses as claimed in claim 16, wherein said cylindrical member is formed into a substantially drum shape including a groove constituted of a flange portion formed in an upper portion thereof, a sectionally arc shaped recess having a predetermined curvature radius located immediately below said flange, and a linear slop surface smoothly continuous with said recess, and said second leg portion of said J-shaped bent portion is bent to be complement with said groove.

26. Eyeglasses as claimed in claim 25, wherein said cylindrical member is formed integrally in such a manner that a leg portion of one of said end member and said temple member contacts with said arc shaped recess.

27. Eyeglasses as claimed in claim 26, wherein said second leg portion is bent from the end portion of the other of said end member and said temple member in an acute angle relative to a straight portion, an outer contour of the bent portion has a curvature radius equal to that of said arc shaped recess.

* * * * *